(12) United States Patent
Gibbs et al.

(10) Patent No.: US 6,735,172 B1
(45) Date of Patent: May 11, 2004

(54) PROVIDING CONNECTION ADMISSION CONTROL IN A COMMUNICATIONS NETWORK

(75) Inventors: Graeme A Gibbs, Saffron Walden (GB); Martin Sabry, Cambridge (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/469,139

(22) Filed: Dec. 21, 1999

(51) Int. Cl.[7] .............................. H04J 1/16; H04J 3/14
(52) U.S. Cl. ...................... 370/235; 370/229; 370/237; 370/395.27
(58) Field of Search ................................ 370/229–236, 370/237, 238.1, 395.1, 395.21, 395.41

(56) References Cited

U.S. PATENT DOCUMENTS 6,028,840 A * 2/2000 Worster ...................... 370/230
6,233,223 B1 * 5/2001 Sabry et al. ................. 370/230

OTHER PUBLICATIONS

Boldt et al, Modeling an ATM–Based Access Network for 3rd generation mobile communication networks, pp. 1–4.*

* cited by examiner

*Primary Examiner*—Wellington Chin
*Assistant Examiner*—Raj Jain
(74) *Attorney, Agent, or Firm*—Barnes & Thornburg

(57) ABSTRACT

Connection admission control to an ATM network from a plurality of sources sharing a common virtual channel connection in which information packets are carried in cells is effected by determining whether that connection requires the transmission of a single packet per cell, partially filled cells containing more than one packet or fully filled cells. Where a single packet is to be transmitted per cell, the bandwidth requirement is calculated via a first algorithm. Where fully filled cells are to be transmitted, the bandwidth requirement is calculated via a second algorithm. Where partially filled cells containing more than one packet are to be transmitted the bandwidth requirement is calculated via an interpolation between the two algorithms. This provides a more accurate measure of equivalent bandwidth and thus facilitates efficient use of network resources.

10 Claims, 6 Drawing Sheets

PROVIDING CONNECTION ADMISSION CONTROL IN A COMMUNICATIONS NETWORK

FIELD OF THE INVENTION

The invention relates to an arrangement and method for connection or call admission control (CAC) in a broadband network. The invention further relates to software for carrying out the method.

BACKGROUND TO THE INVENTION

Broadband, e.g. ATM networks are being increasingly used for the transport of narrow band voice traffic, typically by interfacing the broadband network with one or more legacy TDM voice networks. In order to adapt this narrow band traffic to the ATM transport protocols, it has become common practice to package this traffic into minicells using the ATM Adaptation Layer 2 (AAL2) protocol. These minicells are then transported within ATM cells.

It will be appreciated that one of the constraints placed on the transport of voice traffic is the provision of guarantees on the quality of service (QoS). This in turn requires appropriate network management to ensure that sufficient bandwidth to support the quality of service is, and will remain, available before a call or connection request is accepted. This process is generally referred to as connection admission control.

Connection admission control is one of a number of known techniques for managing and controlling traffic and congestion in, connection-orientated networks. In particular, it is used in ATM (asynchronous transfer mode) networks to provide quality of service (QOS) guarantees. It is not of course limited to use in ATM networks. Connection admission control (CAC) procedures are used to decide if a request for an ATM connection can be accepted, based on the network capacity and the attributes of both the requested connection and existing connections. This is one application which requires that an equivalent bandwidth be determined accurately both for the new connection and for the existing connections. It is important that there is always enough bandwidth so that quality of service guarantees for the existing connections and the requested connections, can be met.

Connection admission control (CAC) procedures may be used at an access node at the edge of an ATM network to enable control of access to the route through the ATM network as route selection is made. A second level, may be used at each node along the selected route through the ATM network, to confirm that a respective link beyond that node, can admit the connection.

An estimate of the bandwidth required by the connection, and knowledge of the available bandwidth on each link is required. The CAC algorithm at the network edge uses parameters available from the routing database, and characteristics of the connection being requested (available from signalling information) to determine if an individual link is likely to accept or reject the connection. The link/node is included if it is likely to accept the connection, and excluded from the route selection algorithm if it is unlikely to accept the connection.

After path selection is done, each node along the chosen route executes its own CAC algorithm, using factors such as link capacity, buffering capability or queuing architecture, traffic descriptors, QOS requirements and capacity allocated to different types of traffic or different connections.

Some of these parameters are fixed and some are variable. Queue size and the desired QOS are examples of fixed parameters, whereas the traffic descriptor and current available link capacity are dynamic parameters. The calculation is complex because connections typically use variable rates of ATM cell flow. Such flows can be described statistically using parameters such peak cell rate, and maximum burst size. By calculating an effective capacity, also known as effective bandwidth, for individual connections, many connections can share the bandwidth of an individual link more efficiently, without having to provide the peak bandwidth for all connections.

Many algorithms have been proposed for determining the effective capacity of the requested connections, and of existing connections. Some are described in an article entitled "Performance Evaluation of Connection Admission Control Techniques in ATM Networks" by Jamoussi et al, published in a 1996 IEEE journal. This article notes that a good CAC algorithm strives to achieve a balance of the objectives of QOS guarantee, execution speed, link efficiency, and simplicity.

A summary of admission techniques is provided by Perros and Khaled in IEEE communications magazine November 1996, "Call Admission control schemes, a review". One known technique is shown in an article by Guerin et al entitled "Equivalent capacity and its application to bandwidth allocation" from the IEEE journal on selected areas in communications. Vol 9, no. 7. It involves determining an approximation for the equivalent bandwidth of an individual connection by using a known relationship between parameters of the connection, size of buffer at the Admission control node, and a quality of service matrix which may be probability of overflow, i.e. cell loss ratio (CLR).

The above referenced paper by Guerin et al shows that an approximation based on a combination of a fluid flow approximation and a stationary or static approximation gives results to an exact evaluation of equivalent capacity as defined by equation (1).

$$\epsilon = \beta \cdot \exp\left(-\frac{K(c - \rho R_{peak})}{b(1 - \rho)(R_{peak} - c)c}\right) \text{ where} \quad (1)$$

$$\beta = \frac{(c - \rho R_{peak}) + \epsilon \rho(R_{peak} - c)}{(1 - \rho)c}$$

$R_{peak}$=Peak rate
□=Probability of overflow (i.e. CLR)
c=Equivalent capacity
K=Buffer size
□=Fraction of time source active
b=Mean duration of active period (talk spurt)

As this equation is computationally extremely strenuous the approximation using the minimum of the fluid flow approximation and the stationary approximation as proposed by Guerin and shown in equation (2) is used.

$$C = \min\left\{\sum_{i=1}^{N} m_i + a' \sqrt{\sum_{i=1}^{N} \sigma_i^2}, \sum_{i=1}^{N} c_j\right\} \quad (2)$$

where $\alpha^1 = \sqrt{\sqrt{-2\ln(\epsilon) - \ln(2\pi)}}$
$m_\square$=Mean bit-rate of $i^{th}$ source $R_{peaki}$=Peak rate of $i^{th}$ source
$\sigma_c^2$=Variance of $i^{th}$ source, $=m_i \times (R_{peaki}-m_i)$
$\varepsilon$=Probability of overflow (i.e. CLR)
$C_a$=the total equivalent bandwidth of N channels As can be seen, this equation (2) is based on values of mean bit rate. Variance, and bandwidth used (otherwise termed equivalent capacity). These values are determined by adding look up values which represent the increment or delta beyond the current running totals of these values, to the existing running totals. The resulting values are used to calculate static and flow approximations and thus the resulting equivalent bandwidth to be in use if the requested connection is to be admitted.

The relationship defined in equation (1) above is complex, and so can only be evaluated by numerical or iterative methods which are too computationally intensive to be usable in a practical network with sufficient accuracy. Accordingly, in Guerin et al, a major factor in this complex relationship, is approximated rather than evaluated. This enables the relationship to be evaluated using normal algebraic methods without requiring a lengthy numerical analysis or iterative method.

To calculate the aggregate equivalent bandwidth of the numerous connections already admitted, so that the available bandwidth can be determined, Guerin et al proposes taking the minimum of two approximations. The first is a static approximation, and the second is a fluid flow approximation. The result is greater than the real equivalent capacity, except where static evaluation under-estimates the equivalent capacity. The static approximation is representative of the bandwidth required for a large number of connections, when the effects of statistical multiplexing become significant. The fluid flow approximation is more representative of actual connection behaviour and so is more useful when the number of connections is small. The static approximation is the sum of the mean bandwidths of the individual connections, which can be measured or estimated, plus a proportion of the standard deviation of the aggregated connection. The proportion reflects the desired quality of service, or risk of dropping part or all of the information flow of one or more connections.

The fluid flow approximation is more difficult to calculate. In Guerin a straightforward summation of the values calculated for individual connections is made. This implies an assumption of a linear relationship between the equivalent bandwidth and the number of connections. In Guerin et al different equivalent capacity values can be calculated for each of several different traffic classes, hence the equivalent bandwidth will depend on both the number of connections, and the traffic class. Nevertheless, the relationships remain linear.

Reference is also here directed to our co-pending applications, Ser. Nos. 09/368,276 and 09/368,278.

A further problem in determining the network parameters in order to provide an efficient connection admission control has arisen in networks that serve a number of small business users who may have a small number of lines served e.g. via a PBX and which share a common virtual circuit connection. These sources can have low traffic flows in which cells transporting the traffic are only partly filled and which exhibit a significant departure from the standard traffic flow model. Such traffic flows are not readily amenable to the calculation of bandwidth requirements using present connection admission control algorithms. To ensure the delivery of a defined quality of service, it is currently necessary to over-estimate the bandwidth demands of such traffic. This leads to a less than efficient use of network resources.

SUMMARY OF THE INVENTION

An object of the invention is to minimise or to overcome the above disadvantage.

A further object of the invention is to provide an improved arrangement and method for connection admission control in a communications network.

According to a first aspect of the invention, there is provided a method for controlling admission of connections to a network from a plurality of sources sharing a common virtual channel connection in which information packets are carried in ATM cells, the method comprising:

receiving a request for admitting a connection to the network, determining whether that connection requires the transmission of a single packet per cell, partially filled cells containing more than one packet or fully filled cells, where a single packet is to be transmitted per cell, calculating a bandwidth requirement via a first algorithm, where fully filled cells are to be transmitted, calculating the bandwidth requirement via a second algorithm, where partially filled cells containing more than one packet are to be transmitted calculating the bandwidth requirement via an interpolation between said first and second algorithms, and determining whether to admit the requested connection according to whether a bandwidth used would exceed a maximum bandwidth allowed for at least a portion of the network.

According to another aspect of the invention, there is provided an arrangement for controlling admission of connections to a network from a plurality of sources sharing a common virtual channel connection in which information packets are carried in cells, the arrangement comprising:

means for receiving a request for admitting a connection to the network, first decision means for determining whether that connection requires the transmission of a single packet per cell, partially filled cells containing more than one packet or fully filled cells, first calculation means for calculating a bandwidth requirement via a first algorithm where a single packet is to be transmitted per cell, second calculation means for calculating a bandwidth requirement via a second algorithm where fully filled cells are to be transmitted, third calculation means for calculating a bandwidth requirement via an interpolation between said first and second algorithms where partially filled cells containing more than one packet are to be transmitted, and second decision means for determining whether to admit the requested connection according to whether a bandwidth used for that connection would exceed a maximum bandwidth allowed for at least a portion of the network.

According to a further aspect of the invention, there is provided a communications network arrangement comprising; an asynchronous transfer mode (ATM) core network, a plurality of gateways providing access to said core network, a plurality of sources sharing a common virtual channel connection in which information packets are carried in ATM cells, and connection admission control means for controlling admission of connections to the core network from said sources, wherein the connection admission control means comprises;

means for receiving a request for admitting a connection to the network,
first decision means for determining whether that connection requires the transmission of a single packet per cell, partially filled cells containing more than one packet or fully filled cells,
first calculation means for calculating a bandwidth requirement via a first algorithm where a single packet is to be transmitted per cell,
second calculation means for calculating a bandwidth requirement via a second algorithm where fully filled cells are to be transmitted,
third calculation means for calculating a bandwidth requirement via an interpolation between said first and second algorithms where partially filled cells containing more than one packet are to be transmitted, and
second decision means for determining whether to admit the requested connection according to whether a bandwidth used for that connection would exceed a maximum bandwidth allowed for at least a portion of the network.

According to another aspect of the invention, there is provided software on a computer readable medium for controlling admission of connections to a network from a plurality of sources sharing a common virtual channel connection in which information packets are carried in cells, wherein the method comprises the steps of:
receiving a request for admitting a connection to the network,
determining whether that connection requires the transmission of a single packet per cell, partially filled cells containing more than one packet or fully filled cells,
where a single packet is to be transmitted per cell, calculating a bandwidth requirement via a first algorithm,
where fully filled cells are to be transmitted, calculating the bandwidth requirement via a second algorithm,
where partially filled cells containing more than one packet are to be transmitted calculating the bandwidth requirement via an interpolation between said algorithms, and
determining whether to admit the requested connection according to whether a bandwidth used would exceed a maximum bandwidth allowed for at least a portion of the network.

BRIEF DESCRIPTION OF THE DRAWINGS

Embodiments of the invention will now be described with reference to the accompanying drawings in which.

DESCRIPTION OF PREFERRED EMBODIMENT

Figure 1:
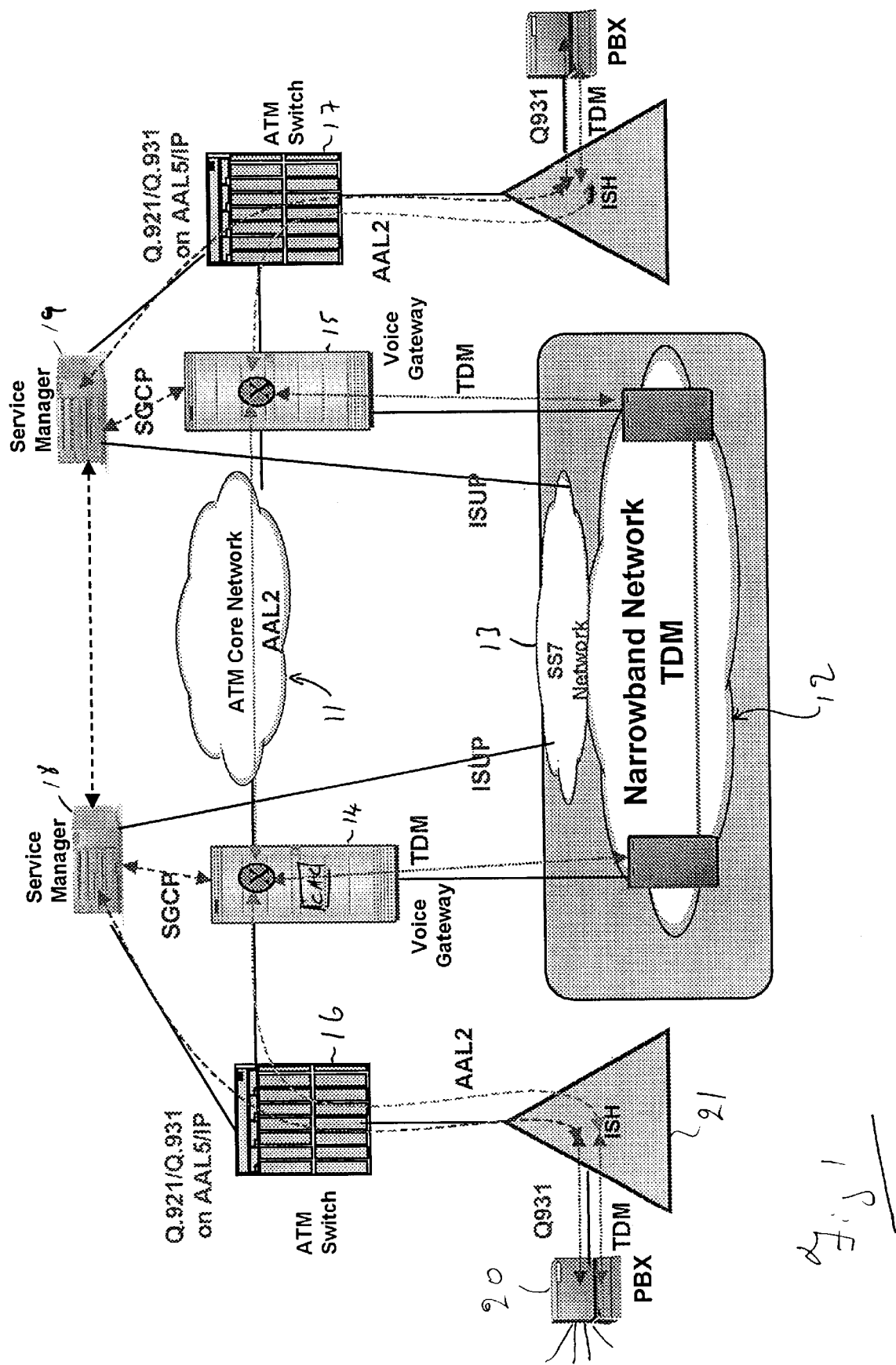
FIG. 1 is a schematic view of a communications network providing asynchronous transport of voice traffic.

Referring first to FIG. 1, which is introduced for explanatory and comparative purposes, this shows in schematic form a typical communications network arrangement in which an ATM core network 11 provides a transport medium for narrow band traffic originating from a TDM network 12 having an SS7 signalling network associated therewith. The narrow band, i.e. voice, traffic is packaged into ATA Adaptation Layer Two (AAL2) minicells for transport over the ATM core. Traffic is multiplexed so that a number of sources can occupy minichannels within a virtual circuit connection.

Access of narrow band traffic to the ATM core is provided via gateways 14, 15 and associated ATM switches 16, 17. Each gateway incorporates a connection admission control to ensure that a new connection or call is admitted only if sufficient bandwidth is available to support the quality of service guarantees for that new connection and for existing connections. The operation of the connection admission control will be described below.

Control and management of the ATM network is provided by service managers 18, 19 which, in response to ISUP signalling messages from the SS7 signalling network, allocate virtual channels for establishing voice connections.

As shown in FIG. 1, the network also serves a number of small business users each having a number of lines deriving from a PBX 20 which has a TDM link to an adaptation interface (ISH) 31 between the local TDM environment and the broadband asynchronous environment. Each such user effectively comprises a number of independent sources sharing a common AAL2 virtual channel connection (VCC).

Figure 2:
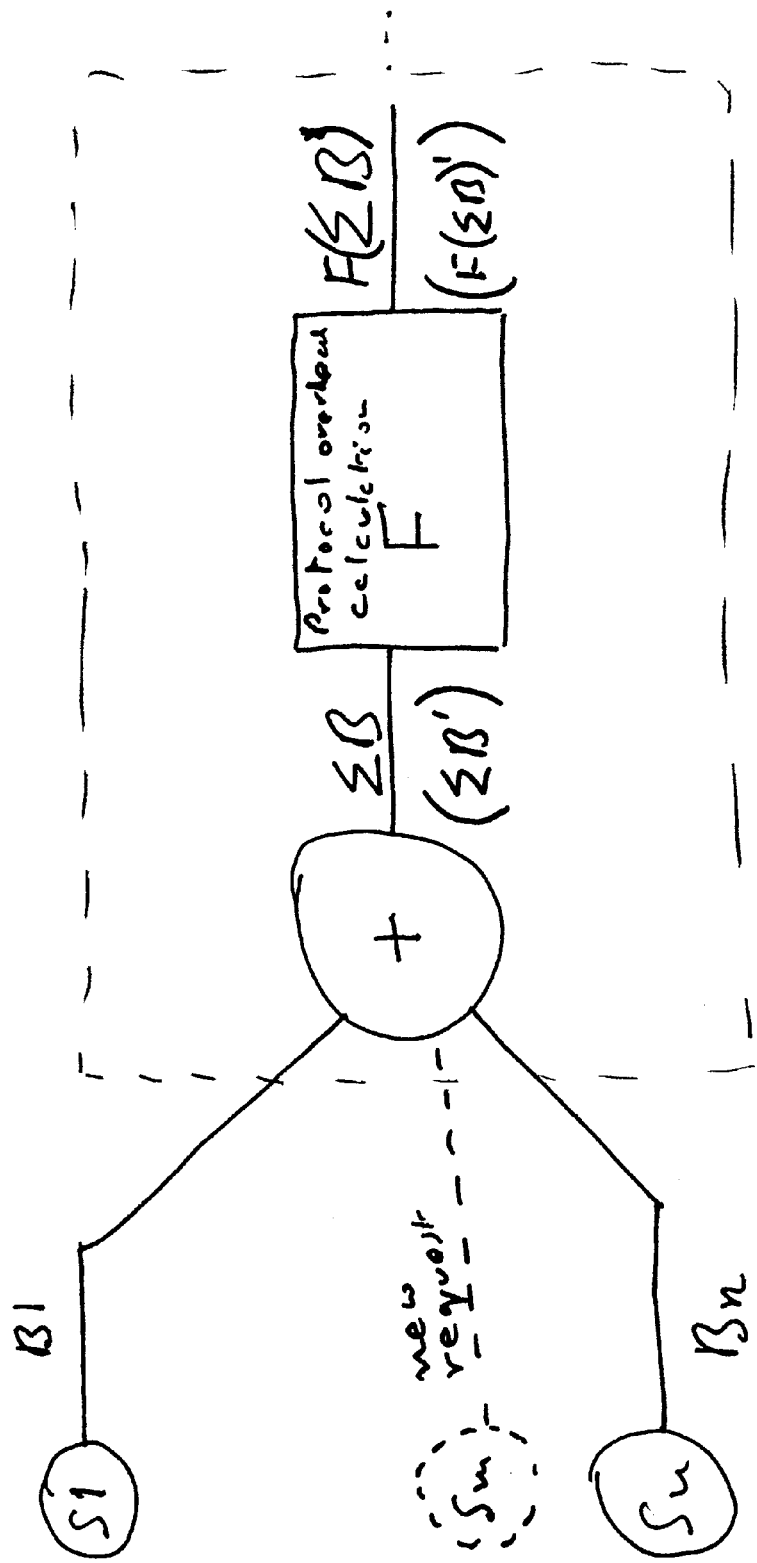
FIG. 2 is a schematic diagram illustrating a number of sources sharing a common AAL2 virtual channel connection.

Referring now to FIG. 2, this illustrates in schematic form the adaptation of voice traffic from a number of sources S1, . . . Sn, into a shared AAL2 virtual channel connection (VCC). Each source has a respective bandwidth requirement B1, . . . Bn. At the adaptation interface 31, the traffic is packaged into AAL2 minicells which are assembled into ATM cells. The interface incorporates a timer 32 having a predetermined period $T_{cu}$ and whose purpose is to limit the assembly delay for the ATM cells. Under busy traffic conditions, cells will be fully filled and will be launched as soon as they are filled with the minimum of delay. However, under less busy conditions, the time required to fill a cell may be unacceptable for voice applications. The purpose of the timer is to ensure that, if a cell has not been filled within the period $T_{CU}$, it is then filled with padding or null information and dispatched without further delay.

The total bandwidth demand for the currently active sources S1, . . . Sn is determined by calculating the sum $\Sigma B$ of the aggregate bandwidth requirements B1, . . . Bn of those sources, and then determining from $\Sigma B$ via a protocol overhead calculation function a value $F(\Sigma B)$ which represents the VCC equivalent cell rate to be used in voice connection admission control. It should be noted that $\Sigma B$ will not in general be a linear summation of B1, . . . Bn. An exemplary method of determining $F(\Sigma B)$ will be described below.

As illustrated in FIG. 2, a new request changes the bandwidth requirement from $F(\Sigma B)$ to $F(\Sigma B)'$, and it is this latter value that is used to determine whether or not a new request may be accommodated. This new request may be a new call requesting admission, or an existing call may arrive in the network which then has to determine whether that call can be maintained. The term 'request' is used herein in this broader sense.

We have found that, for a number of independent voice sources sharing a common AAL2 VCC as illustrated in FIG.

2, the problem of determining the bandwidth demand in order to provide effective connection admission control is complex. This is partly due to the 'bursty' nature of these sources which will generally be G.72 sources or G.711 sources.. While the AAL2 overhead (3 octets) is fixed for each source S1 . . . Sn and thus adds a known bandwidth requirement (BW), e.g. a bursting G711 source is equivalent to 64 kpbs.43/40, the amount of ATM overhead these sources' share is not fixed but will depend on timer $T_{cu}$ value, their own packetisation period and the output of all the other sources.

Figure 3:
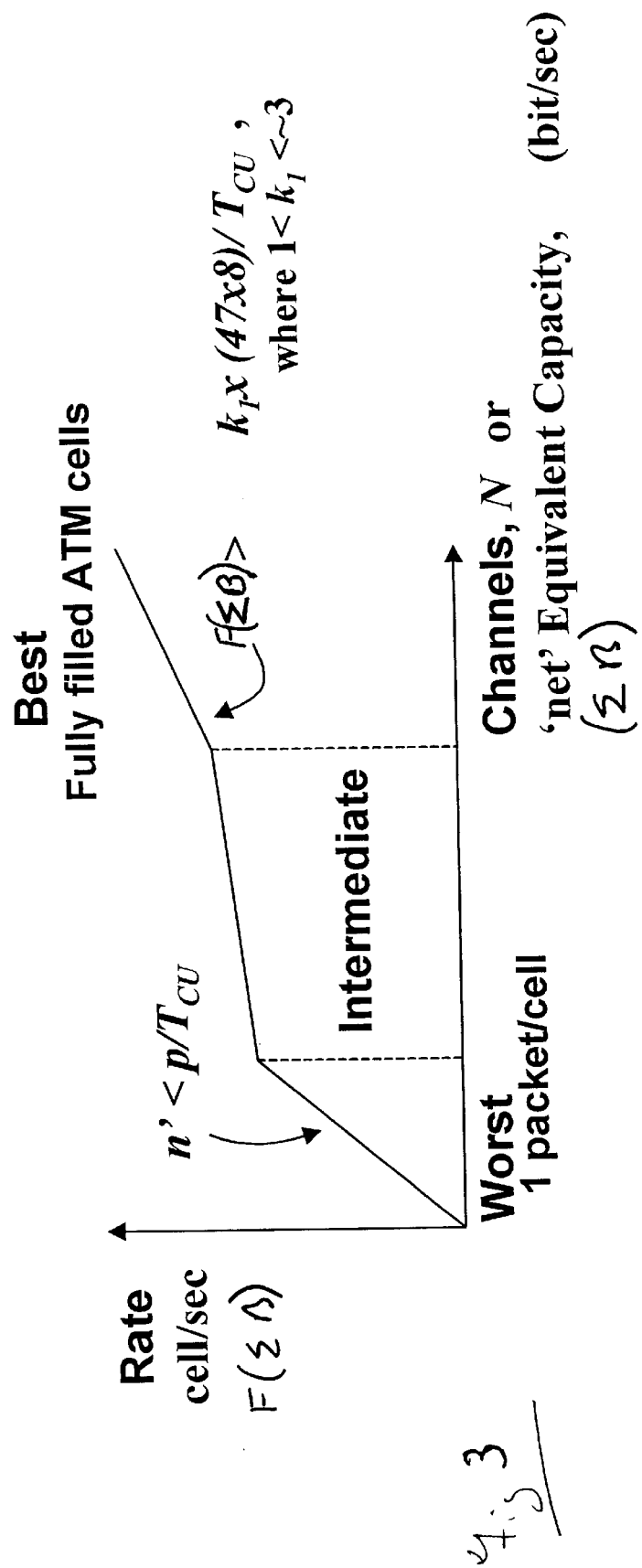
FIG. 3 illustrates the relationship between first order calculated and effective bandwidth demands in the network of FIG. 1.

We have established that initial step in maximising the level of efficiency of AAL2 multiplexing is the definition of three traffic conditions, these being illustrated in FIG. 3. In the worst case there is only one packet per cell when the cell is dispatched, while in the best case, all the cells are fully filled. There is an intermediate region where the cells contain more than one packet, but are only partly filled when they are dispatched. The transitions between these regions are a function of the packet arrival rate, which is determined by the number of active channels, the packetisation interval etc., and the timer period $T_{CU}$.

For a large number of active sources, it can be safely assumed that the timer never expires and that all the cells are fully filled thus allowing a standard traffic model to be employed to calculate the aggregate bandwidth $\Sigma B$ in order to determine whether or not this would exceed the overall 'pipe' capacity. In this standard model, $F(\Sigma B)$ can be calculated as $\Sigma B.53/47$. This takes into account the additional overhead requirement associated with the traffic.

Figure 4:
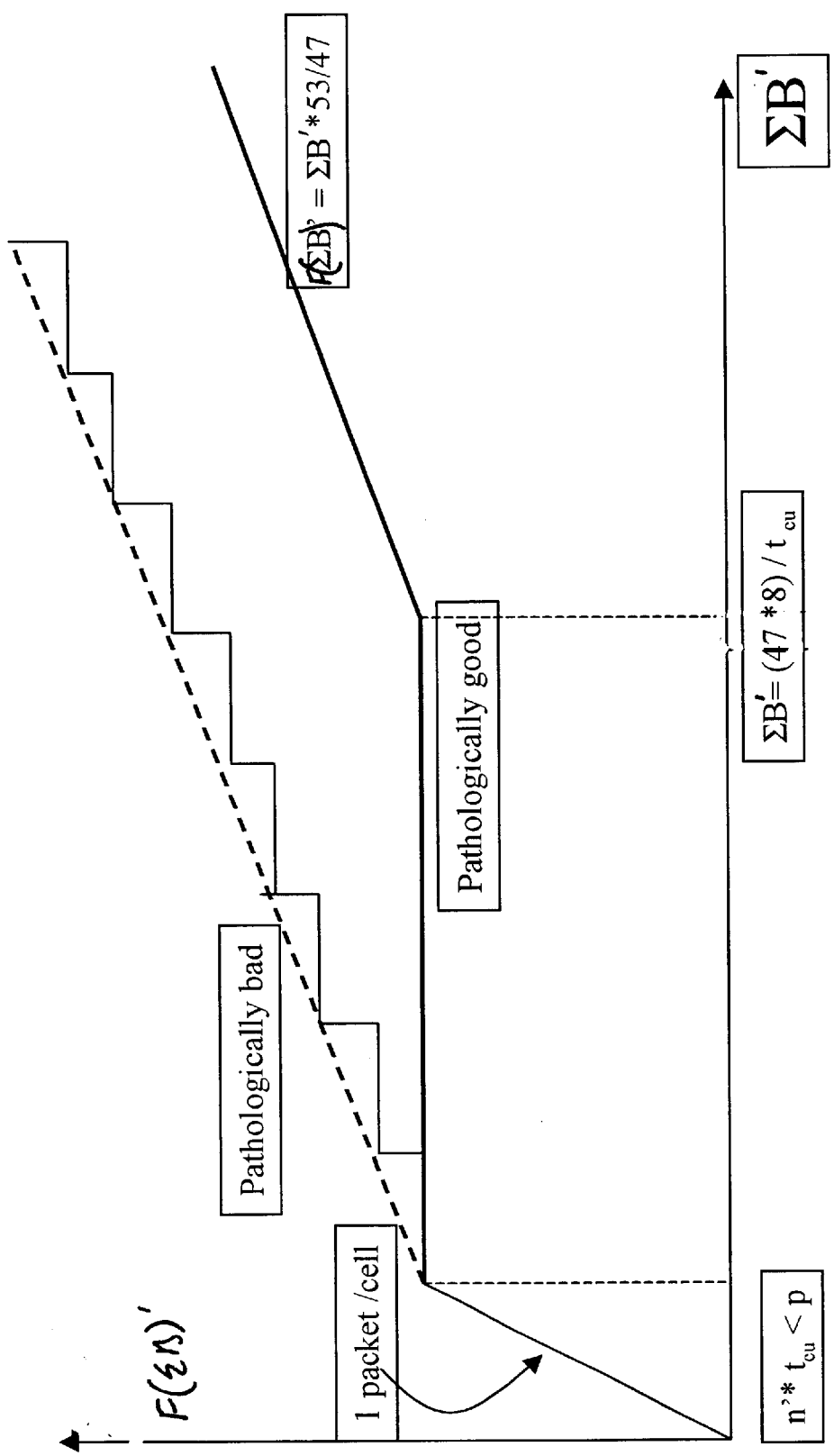
FIG. 4 illustrates the effects of the different cell fill level conditions.

The problem is thus exacerbated for smaller numbers of sources, as further illustrated in FIG. 4, where there is insufficient traffic to fill ATM cells within the pre-set period $T_{cu}$ of the timer. Indeed, in the worst case there may be only one packet per cell.

At a low number of bursting sources (n'), the timer period $T_{CU}$ will have a dominant factor and cells will be sent not completely full.

For very low values of $T_{cu}$ with respect to packetisation time, one has a scenario where as one cannot make any assumptions about the phase relationship of sources and the worst case must be assumed, i.e. one packet per cell for all bursting sources (n').

Thus while $n'^*T_{cu} <=$ packetisation period then $F(\Sigma B)' <= 53*8*n'/p$.

The worst case assumption must therefore take $F(\Sigma B)' = 53*8*n'/p$

The first issue to decide is what is n', the number of bursting sources. For fluid flow n'=number of active sources=number of connections (n), whereas for stationary flow n'=$\Sigma B$/average BW per bursting source.

An approximation will be taken that n'=n*$\Sigma B/\Sigma B_f$ where $\Sigma B_f$ is deemed to be sum of all sources bursting.

The next issue arises due to the fact that packetisation period (p) is not the same for all sources. The exemplary algorithm described below addresses this issue by taking a normalised packetisation period and counting sources that produce j packets within this period as j independent sources. So, for example, where $p_{G.72x}$=10 ms and $p_{G.711}$=5 ms, then p=10 ms and n"=#G.72×source+2*#G.711 sources.
So while $\Sigma B/\Sigma Bpk*(\#G.72\times source+2*\#G.711\ sources)*T_{cu} < p$,
Then $F(\Sigma B)' <= 53*8* \Sigma B/\Sigma B_{pk}*(\#G.72\times source+2*\#G.711\ sources)/p$. Where $T_{cu}$>packetisation time but $\Sigma B < 47*8/T_{cu}$, it can be assumed that cells will continue to be sent incompletely filled, therefore $F(\Sigma B)'=53*8/T_{cu}$ (except for the case where n'=0).

For intermediate values between these two extremes, there are two possible conditions, also illustrated in FIG. 4.

For the range where $n'^*Timer_{cu}$>packetisation period and $\Sigma B < \Sigma B_1 = k1*(47*8)/T_{cu}$ where k1 is greater than unity and is typically less than three.

We have two extreme options to take that bound the equation

Pathologically Good

In this condition, packets arrive in a uniformly distributed fashion. Cells go every timer period $T_{cu}$ and on average we get no more cells until on average all cells are full. Thereafter the timer $T_{cu}$ never expires and $F(\Sigma B)' = \Sigma B'*53/47$ Pathologically Bad Here (x−1) packets go one per cell where $x^*T_{cu}$= packetisation period, and all other packets arrive simultaneously and are sent 100% packed (except for last cell)

In our arrangement and method, we determine the bandwidth requirement for performing connection admission control by treating the three regions separately. For the best region where all cells are fully filled, we determine $$F(\Sigma B)' \text{ as } \Sigma B'.53/47. \qquad (1)$$

Within this region, $\Sigma B > k.47.8/T_{CU}$

For the worst region where there is only one packet per cell, we determine $$F(\Sigma B)' \text{ as } {}^{53.8}/T_{CU}. \qquad (2)$$

Figure 5:
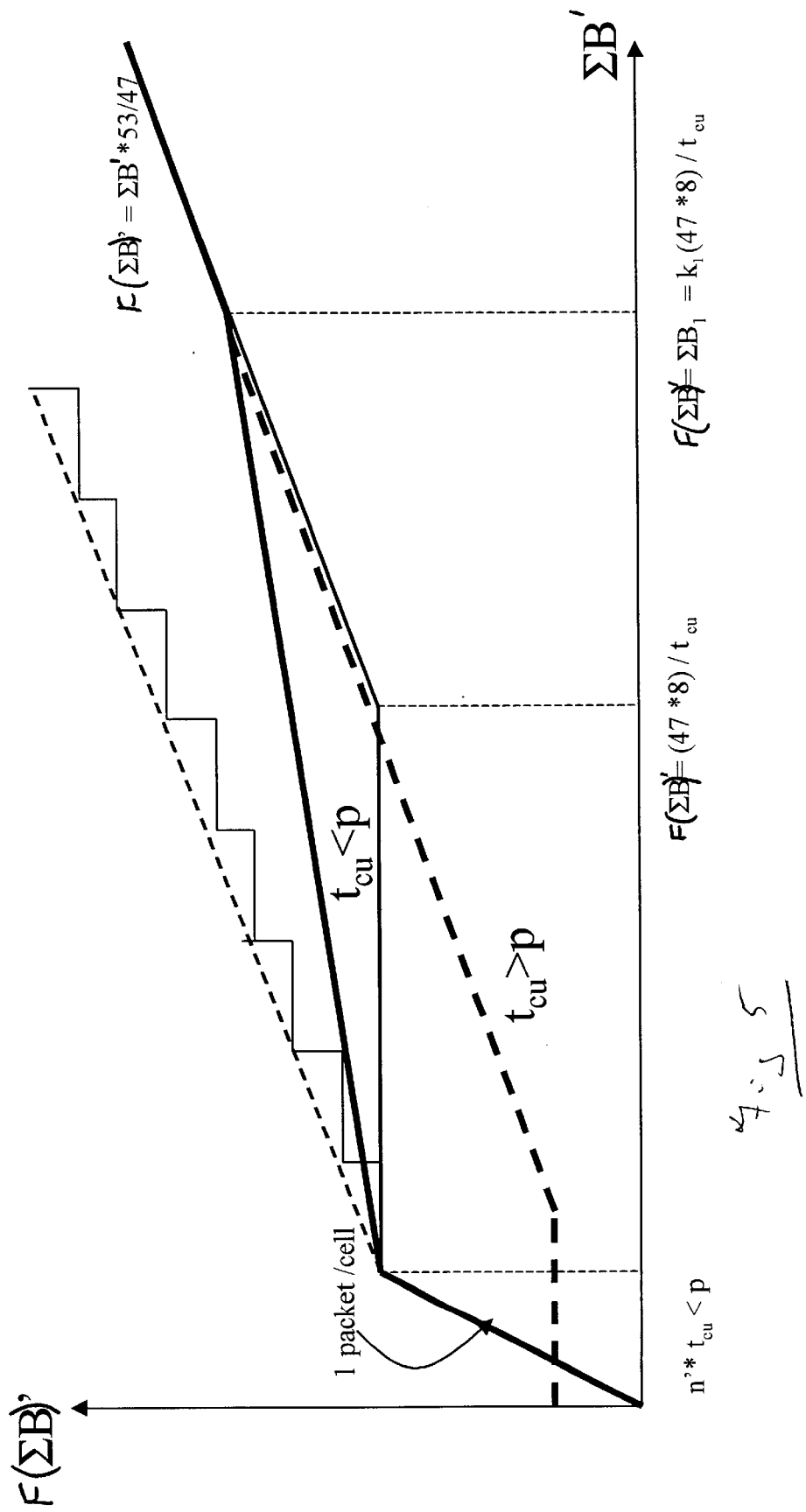
FIG. 5 illustrates an exemplary method of determining bandwidth demand in order to perform connection admission control.

For the intermediate region, we determine $F(\Sigma B)'$ by interpolating between the above two (1) and (2). This is illustrated in FIG. 5.

A preferred algorithm for calculating the bandwidth requirement is detailed below:
Per change to network BW (up or down)
Calculate Fluid Flow $\Sigma Bf=C_i$
Calculate Stationary Flow $\Sigma Bs=\Sigma m_i + \alpha\Sigma_i\sigma^2_i$
Calculate n"=Equivalent number of active sources per normalised packetisation period
n"=#G.72×source+2*#G.711 sources
Calculate $\Sigma B'$=min ($\Sigma Bf$, $\Sigma Bs$)
Calculate n"=Equivalent number of bursting sources per normalised packetisation period
n'=ABS $|n"* \Sigma B'/\Sigma Bf|$
If $n' < p/t_{cu}$ then $F(\Sigma B)'=53*8* n'/p$
If $t_{cu} > p$ and $\Sigma B' < (47*8)/t_{cu}$ then $F(\Sigma B)'=53*8/t_{cu}$
If $\Sigma B/(47*8) > k_1/t_{cu}$ then $F(\Sigma B)' = \Sigma B'*53/47$
Else $F(\Sigma B)'=\Sigma B'*53/47+53*8*(\Sigma B_1 - \Sigma B')/(\Sigma B_1 * t_{cu})$
If $F(\Sigma B)' <$ ECR then CAC is successful
Store n", $\Sigma c_i$, $\Sigma m_i$, $\Sigma \sigma^2_i$
Advantageously, the algorithm is provided in the form of machine readable operating instructions on a storage medium.

Having determined the bandwidth requirement via the above algorithm, the connection admission control can then determine whether sufficient bandwidth is available to accommodate a new connection.

Figure 6:
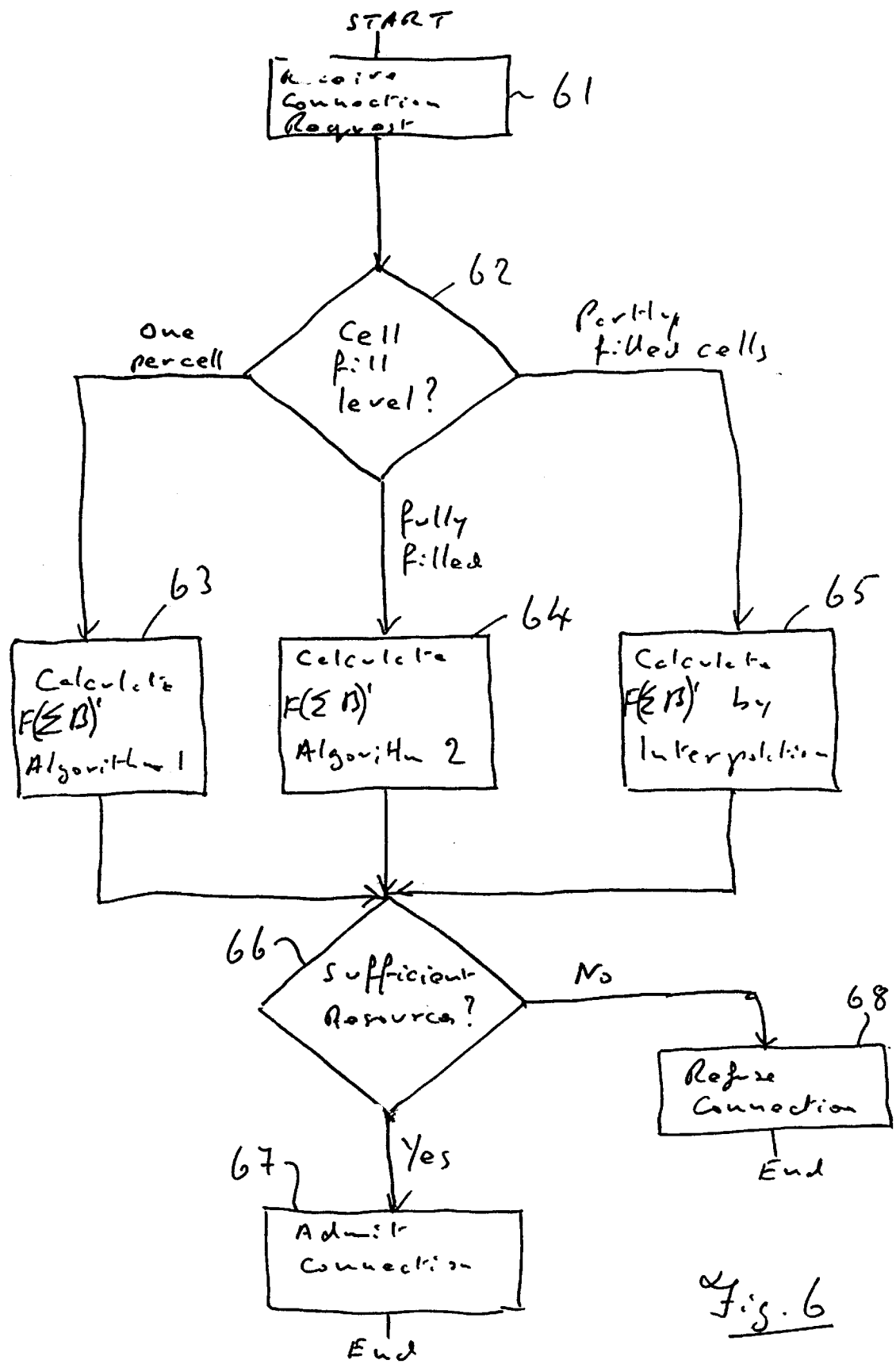
FIG. 6 is a flow chart illustrating the operation of the connection control mechanism.

Referring now to FIG. 6, this is a flow chart diagram illustrating the operation of the connection admission control of FIG. 1. The flow chart comprises a number of steps and decision points. In step 61, a request is received for a new connection. At decision point 62, the fill level of the cells for that connection is determined and the appropriate one of three outputs is enabled. Where there is a single packet per cell, F(ΣB)' is calculated at step 63 using the first algorithm. Where the cells are fully filled, F(ΣB)' is calculated at step 64 using the second algorithm. Where the cells are partly filled, F(ΣB)' is calculated at step 65 by interpolating between the first and second algorithm. The resultant determination of F(ΣB)' is fed to decision point 66 which determines whether sufficient resources are available to admit the new connection. If sufficient resources are available, an accept connection response is generated at step 67. If however there are insufficient resources available to support the new connection, a refuse connection response is generated at step 68. If the connection request represents an existing call which cannot be maintained, then this refusal results in the return of busy tone.

It will of course be understood that that the above description of the application of the technique to AAL2 transport in an ATM network is given by way of example only, and that the technique has a broader application to cell based transport mechanisms in which high priority traffic is carried in variable length minicells. It will further be understood that various modifications may be made by those skilled in the art without departing from the spirit and scope of the invention.

We claim:

1. A method for controlling admission of connections to a network from a plurality of sources sharing a common virtual channel connection in which information packets are carried in cells, the method comprising:

receiving a request for admitting a connection to the network, determining whether that connection requires the transmission of a single packet per cell, partially filled cells containing more than one packet or fully filled cells, where a single packet is to be transmitted per cell, calculating a bandwidth requirement via a first algorithm, where fully filled cells are to be transmitted, calculating the bandwidth requirement via a second algorithm, where partially filled cells containing more than one packet are to be transmitted calculating the bandwidth requirement via an interpolation between said algorithms, and determining whether to admit the requested connection according to whether a bandwidth used would exceed a maximum bandwidth allowed for at least a portion of the network.

2. A method as claimed in claim 1, wherein said cells are ATM cells.

3. A method as claimed in claim 2, wherein said information packets comprise variable length minicells.

4. A method as claimed in claim 3, wherein said minicells are AAL2 minicells.

5. A method as claimed in claim 1, wherein said sources have different packetisation periods, and wherein the number of sources is determined as a corresponding number of normalised sources generating a preset number of packets within a predetermined period.

6. A method as claimed in claim 5, wherein said bandwidth requirement is determined from the following method steps:

Per change to network BW (up or down)
  Calculate Fluid Flow $\Sigma Bf = \Sigma C_i$
  Calculate Stationary Flow $\Sigma Bs = \Sigma m_i \alpha \Sigma \sigma^2_i$
  Calculate n"=Equivalent number of active sources per normalised packetisation period
    n"=G.72×source+2*G.711 sources
  Calculate ΣB'=min (ΣBf, ΣBs)
  Calculate n'=Equivalent number of bursting sources per normalised packetisation period
    n'=ABS|n"*ΣB'/ΣBf|
  If $n' < p/t_{cu}$ then F(ΣB)'=53*8*n'/p
  If $t_{cu} > p$ and $\Sigma B' < (47*8)/t_{cu}$ then F(ΣB)'=53*8/$t_{cu}$
  If $\Sigma B/(47*8) > k_1/t_{cu}$ then F(ΣB)'=ΣB'*53/47
  Else F(ΣB)'=ΣB'*53/47+53*8*(ΣB$_1$−ΣB')/(ΣB$_1$*$t_{cu}$)
  If F(ΣB)'<ECR then CAC is successful
  Store n", $\Sigma c_i$, $\Sigma m_i$, $\Sigma \sigma^2_i$.

7. An arrangement for controlling admission of connections to a network from a plurality of sources sharing a common virtual channel connection in which information packets are carried in ATM cells, the arrangement comprising:

means for receiving a request for admitting a connection to the network, first decision means for determining whether that connection requires the transmission of a single packet per cell, partially filled cells containing more than one packet or fully filled cells, first calculation means for calculating a bandwidth requirement via a first algorithm where a single packet is to be transmitted per cell, second calculation means for calculating a bandwidth requirement via a second algorithm where fully filled cells are to be transmitted, third calculation means for calculating a bandwidth requirement via an interpolation between said first and second algorithms where partially filled cells containing more than one packet are to be transmitted, and second decision means for determining whether to admit the requested connection according to whether a bandwidth used for that connection would exceed a maximum bandwidth allowed for at least a portion of the network.

8. An arrangement as claimed in claim 7, and incorporated in a gateway controlling access to an ATM network.

9. A communications network arrangement comprising; an asynchronous transfer mode (ATM) core network, a plurality of gateways providing access to said core network, a plurality of sources sharing a common virtual channel connection in which information packets are carried in ATM cells, and connection admission control means for controlling admission of connections to the core network from said sources, wherein the connection admission control means comprises;

means for receiving a request for admitting a connection to the network, first decision means for determining whether that connection requires the transmission of a single packet per cell, partially filled cells containing more than one packet or fully filled cells, first calculation means for calculating a bandwidth requirement via a first algorithm where a single packet is to be transmitted per cell, second calculation means for calculating a bandwidth requirement via a second algorithm where fully filled cells are to be transmitted, third calculation means for calculating a bandwidth requirement via an interpolation between said first and second algorithms where partially filled cells containing more than one packet are to be transmitted, and second decision means for determining whether to admit the requested connection according to whether a bandwidth used for that connection would exceed a maximum bandwidth allowed for at least a portion of the network.

10. Software on a computer readable medium for performing a method of controlling admission of connections to a network from a plurality of sources sharing a common virtual channel connection in which information packets are carried in ATM cells, wherein the method comprises the steps of:

receiving a request for admitting a connection to the network, determining whether that connection requires the transmission of a single packet per cell, partially filled cells containing more than one packet or fully filled cells, where a single packet is to be transmitted per cell, calculating a bandwidth requirement via a first algorithm, where fully filled cells are to be transmitted, calculating the bandwidth requirement via a second algorithm, where partially filled cells containing more than one packet are to be transmitted calculating the bandwidth requirement via an interpolation between said algorithms, and determining whether to admit the requested connection according to whether a bandwidth used would exceed a maximum bandwidth allowed for at least a portion of the network.

* * * * *